United States Patent [19]

Torii et al.

[11] Patent Number: 4,842,474
[45] Date of Patent: Jun. 27, 1989

[54] VERTICAL MULTI-ARTICULATED ROBOT

[75] Inventors: Nobutoshi Torii, Hachioji; Hitoshi Mizuno, Hino; Kyoji Iwasaki, Tokyo, all of Japan

[73] Assignee: Fanuc Ltd., Yamanashi, Japan

[21] Appl. No.: 150,429

[22] PCT Filed: May 26, 1987

[86] PCT No.: PCT/JP87/00333

§ 371 Date: Jan. 25, 1988

§ 102(e) Date: Jan. 25, 1988

[87] PCT Pub. No.: WO87/07200

PCT Pub. Date: Dec. 3, 1987

[30] Foreign Application Priority Data

May 26, 1986 [JP] Japan .................... 61-119085

[51] Int. Cl.$^4$ .............................. B25J 18/00
[52] U.S. Cl. ...................... 414/680; 74/479; 901/15; 901/48
[58] Field of Search ............ 414/730, 744, 680; 901/15, 48, 23, 24, 26; 74/479

[56] References Cited

U.S. PATENT DOCUMENTS 3,241,687  3/1966  Orloff ....................... 901/37 X
4,693,663  9/1987  Brenholt et al. ................ 901/15

FOREIGN PATENT DOCUMENTS 51-16557   2/1976  Japan .
58-154086 10/1983  Japan .
58-177285 10/1983  Japan .
58-202786 11/1983  Japan .

Primary Examiner—Robert J. Spar
Assistant Examiner—Donald W. Underwood
Attorney, Agent, or Firm—Armstrong, Nikaido, Marmelstein, Kubovcik & Murray

[57] ABSTRACT

A vertical milti-articulated robot comprises a base (11) secured to a plane (10) of installation. The base (11) is provided with a turning body (12) which is rotatable relative to a reference position of the base about a first axis (θ) perpendicular to the plane of installation within an angular range of nearly 90 degrees to the right and to the left, respectively. The turning body (12) is rotated by a body drive motor (14) about the first axis. An upper arm (16) having a base end and a tip is coupled at the base end thereof to the turning body (12) so as to be rotatable relative to the turning body about a second horizontal axis (W) from a nearly vertical attitude toward the front of the turning body. A forearm (19) having at the front end thereof a wrist assembly (20) is coupled to the tip of the upper arm so as to be rotatable relative to the upper arm about a third axis (U) which is parallel to the second axis. The upper arm (16) is provided with an upper arm drive motor for driving and rotating the upper arm relative to the turning body about the second axis and a forearm drive motor for driving and rotating the forearm relative to the upper arm about the third axis. The upper arm drive motor and the forearm drive motor are arranged at the back of a first plane (A-A) including the second and third axes so that the rotational axes of these motors are located on a second plane (B-B) which intersects the second axis at a right angle.

5 Claims, 6 Drawing Sheets

VERTICAL MULTI-ARTICULATED ROBOT

TECHNICAL FIELD

The present invention relates to a vertical multi-articulated robot, and more particularly, to an improvement of a vertical multi-articulated robot comprising a base secured onto a plane of installation such as a surface of a floor, a turning body provided on the base and rotatable relative to a reference position of the base about a first axis perpendicular to the plane of installation within an angular range of nearly 90 degrees to the right and to the left, respectively, a body drive motor for driving and rotating the turning body relative to the base about the first axis, an upper arm having a base end and a tip and coupled at the base end thereof to the turning body so as to be rotatable relative to the turning body about a second horizontal axis from a nearly vertical attitude toward the front of the turning body, an upper arm drive motor for driving and rotating the upper arm relative to the turning body about the second axis, a forearm coupled to the tip of the upper arm so as to be rotatable relative to the upper arm about a third axis parallel to the second axis and provided at the front end thereof with a wrist assembly, and a forearm drive motor for driving and rotating the forearm relative to the upper arm about the third axis.

BACKGROUND ART

In conventional vertical multi-articulated robots having a turning body rotatable about a first rotational axis, an upper arm is arranged to rotate about a second rotational axis intersecting the first axis at a right angle, an upper arm drive motor is attached to the turning body, and a forearm drive motor is attached to the upper arm. These motors are arranged coaxially with the rotational axis of the upper arm and project laterally in opposite directions from an interconnecting portion between the upper arm and the turning body. Output shafts of the upper arm drive motor and the forearm drive motor are connected through reduction gears and power transmitting mechanisms to rotatable shafts of the upper arm and forearm, respectively.

In the above-mentioned robot, generally, a moment of force about the second axis due to gravity is increased, and accordingly, the load of the upper arm drive motor is increased, as the upper arm moves from a vertical attitude where the tip thereof is orientated immediately above to a horizontal attitude. Accordingly, it is necessary to provide a high power motor as an upper arm drive motor. In order to decrease the load of the upper arm drive motor due to a moment of force, conventional vertical multi-articulated robots are provided with a counter-balancing mechanism using a force of a spring provided between the turning body and the upper arm. However, the use of the counter-balancing mechanism complicates the structure of the robots and increases manufacturing costs thereof.

In turn, the conventional vertical multi-articulated robot has a workable region which is defined, generally, within an angular range of 90 degrees to the right and to the left, respectively, relative to a reference position of the base about the first rotational axis of the turning body. However, in the conventional vertical multi-articulated robot, the upper arm drive motor and the forearm drive motor projecting laterally in opposite directions from the interconnecting portion between the upper arm and the turning body move into the workable region of the robot, as the turning body rotates. Accordingly, the workable region of the robot is considerably reduced due to the necessity of ensuring therein a space permitting these movements of the upper arm drive motor and the forearm drive motor.

DISCLOSURE OF THE INVENTION

In view of the above-mentioned problems, an object of the present invention is to provide a vertical multi-articulated robot which can reduce a load acting on an upper arm drive motor by means of a simple structure and effectively ensure maximum use of a workable region thereof.

According to the present invention, there is provided a vertical multi-articulated robot comprising a base secured onto a plane of installation, a turning body provided on the base and rotatable relative to a reference position of the base about a first axis perpendicular to the plane of installation within an angular range of nearly 90 degrees to the right and to the left, respectively, a body drive motor for driving and rotating the turning body relative to the base about the first axis, an upper arm having a base end and a tip and coupled at the base end thereof to the turning body so as to be rotatable relative to the turning body about a second horizontal axis from a nearly vertical attitude toward the front of the turning body, an upper arm drive motor for driving and rotating the upper arm relative to the turning body about the second axis, a forearm coupled to the tip of the upper arm so as to be rotatable relative to the upper arm about a third axis parallel to the second axis and provided at the front end thereof with a wrist assembly, and a forearm drive motor for driving and rotating the forearm relative to the upper arm about the third axis, characterized in that the upper arm drive motor and the forearm drive motor are attached to the upper arm and arranged at the back of a first plane including the second and third axes so that the rotational axes of these motors are located on a second plane which intersects the second axis at a right angle.

In the vertical multi-articulated robot according to the present invention, when the upper arm is inclined forward, the weight of the upper arm drive motor and the forearm drive motor can generate moments of force, respectively, in a direction opposite to a direction of inclination of the upper arm about the second axis. Accordingly, the load of the upper arm drive motor can be reduced without the need for a counter-balancing mechanism using a force of a spring. Further, since the upper arm drive motor and the forearm drive motor are arranged at the back of the first plane including the second and third axes, so that the rotational axes of these motors are located on the second plane which intersects the second axis at a right angle, the upper arm drive motor and the forearm drive motor are substantially kept out of the workable region of the robot when the turning body rotates about the first axis within the angular range of nearly 90 degrees to the right and to the left, respectively, relative to the reference position. Accordingly, it is possible to effectively ensure maximum use of the workable region of the robot.

The above-mentioned and other objects and features of the present invention will become more apparent from the following detailed description in conjunction with the accompanying drawings.

BEST MODE FOR CARRYING OUT THE INVENTION

Figure 1:
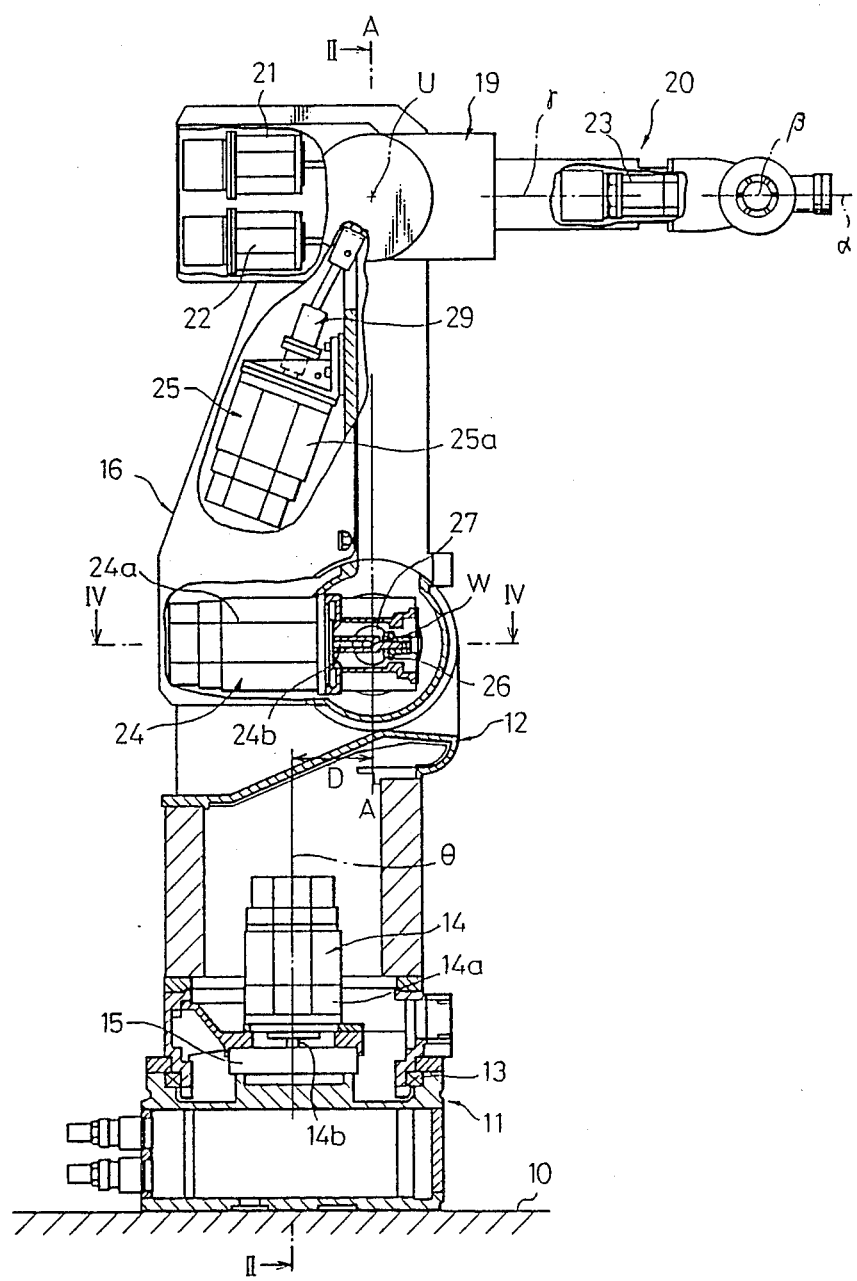
FIG. 1 is a schematic side view partly in section illustrating a vertical multi-articulated robot according to one embodiment of the present invention.

FIGS. 1 through 6 illustrate one embodiment of the present invention. Referring to these Figures, a vertical multi-articulated robot comprises a base 11 secured to a plane 10 of installation such as a surface of a floor. The base 11 is provided with a turning body 12 rotatably supported thereon through a bearing 13 for rotation about a first rotational axis $\theta$ perpendicular to the plane 10 of installation. A drive motor 14 for the turning body is disposed in the turning body 12 and arranged coaxially with the first axis $\theta$. A housing 14a of the motor 14 is fixed to the turning body 12, and an output shaft 14b of the motor 14 is connected to the base 11 through reduction gears 15.

The turning body 12 is provided with an upper arm 16 rotatably supported at the base end thereof by the top of the turning body 12 through a pair of bearings 17 and 18 (shown in FIG. 2) for rotation about a second horizontal-rotational axis W. In this embodiment, the second axis W of the upper arm 16 is in front of and apart from the first axis $\theta$ of the turning body 12 by a distance D.

The upper arm 16 is provided with a forearm 19 rotatably supported at the rear portion thereof by the tip of the upper arm 16 for rotation about a third axis U parallel to the second axis W. The forearm 19 is provided at the front end thereof with a wrist assembly 20 movable about each of three axes $\gamma$, $\beta$ and $\alpha$. The wrist assembly 20 is driven by three wrist drive motors 21, 22, and 23. Since the structure of the wrist assembly 20 and the drive mechanism therefor are not important in the present invention, a detailed illustration and description thereof is omitted.

The upper arm 16 is provided therein with an upper arm drive motor 24 for driving and rotating the upper arm 16 about the second axis W and a forearm drive motor 25 for driving and rotating the forearm 19 about the third axis U. Housings 24a and 25a of the motors 24 and 25 are fixed to the upper arm 16.

The housings 24a and 25a are arranged at the back of a first plane (a surface taken along the line A-A in FIG. 1) including both the second axis W of the upper arm 16 and the third axis U of the forearm 19, and the rotational axis of the upper arm drive motor 24 and the rotational axis of the forearm drive motor 25 are located on a second plane (a plane taken along the line B-B in FIG. 2) which intersects the second axis W of the upper arm 16 at a right angle.

Further, in this embodiment, the upper arm drive motor 24 is fixed to the upper arm 16 so that the rotational axis thereof intersects the first plane (A-A) at a right angle, and the forearm drive motor 25 is fixed to the upper arm 16 so that the rotational axis thereof intersects the first plane (A-A) at an acute angle.

Figure 2:
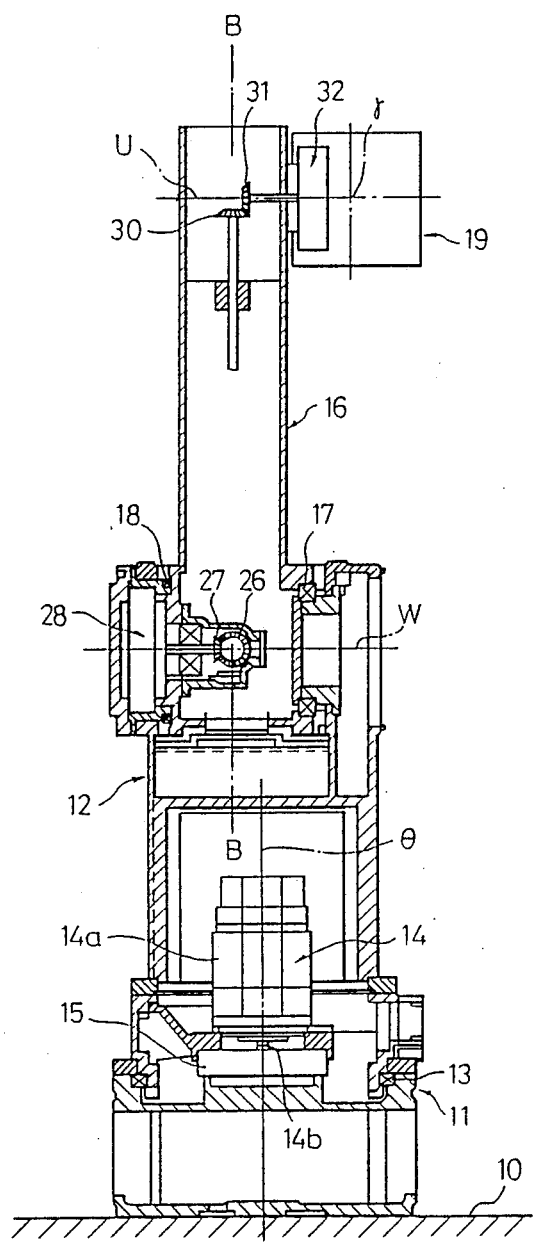
FIG. 2 is a schematic cross-sectional view of the robot shown in FIG. 1, taken along the line II—II in FIG. 1.
Figure 3:
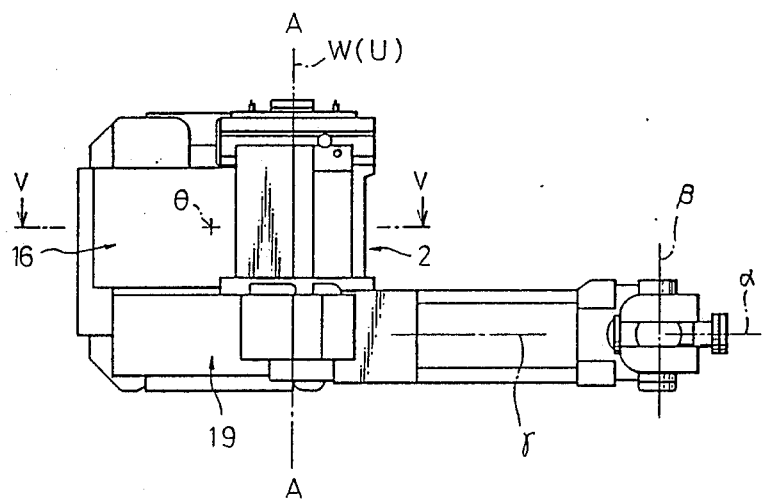
FIG. 3 is a plan view of the robot shown in FIG. 1.
Figure 4:
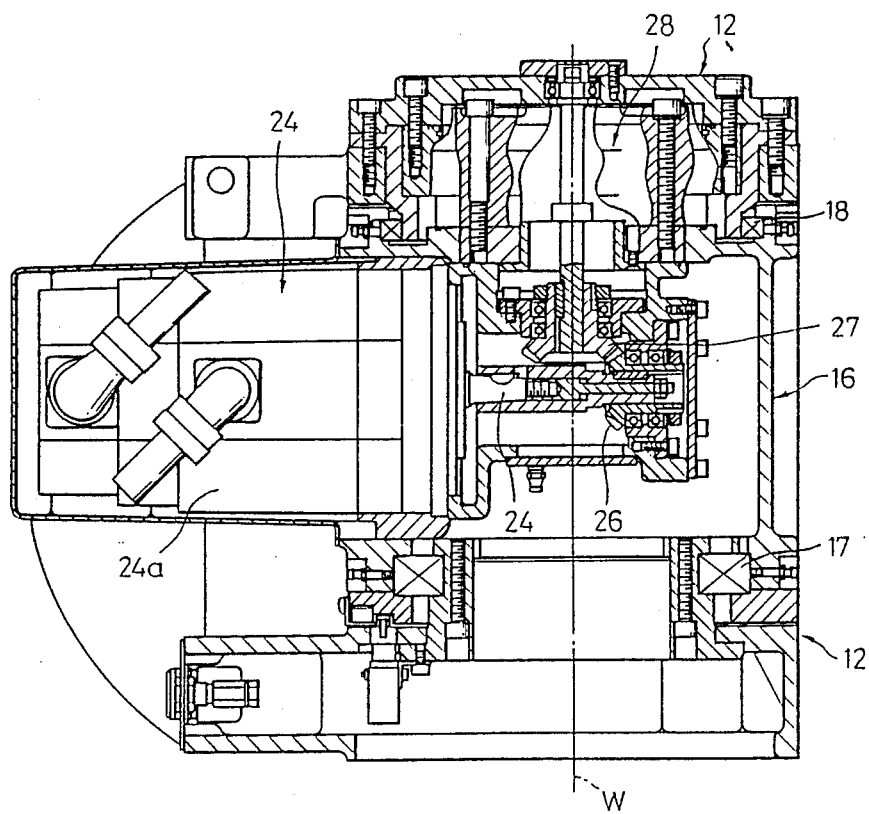
FIG. 4 is a cross-sectional view of a part of the robot shown in FIG. 1, taken along the line IV—IV in FIG. 1.
Figure 5:
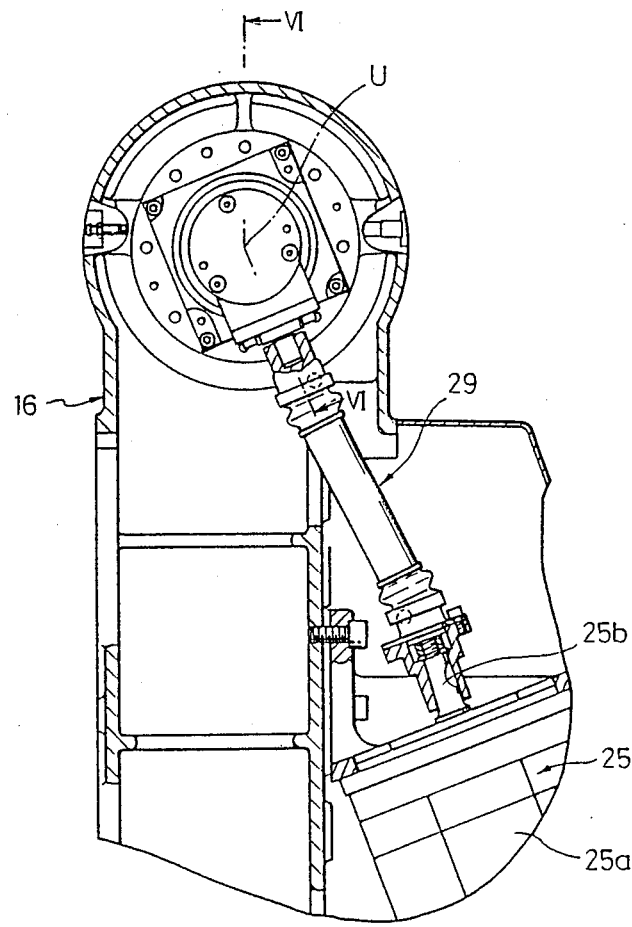
FIG. 5 is a cross-sectional view of a part of the robot shown in FIG. 1, taken along the line V—V in FIG. 3.
Figure 6:
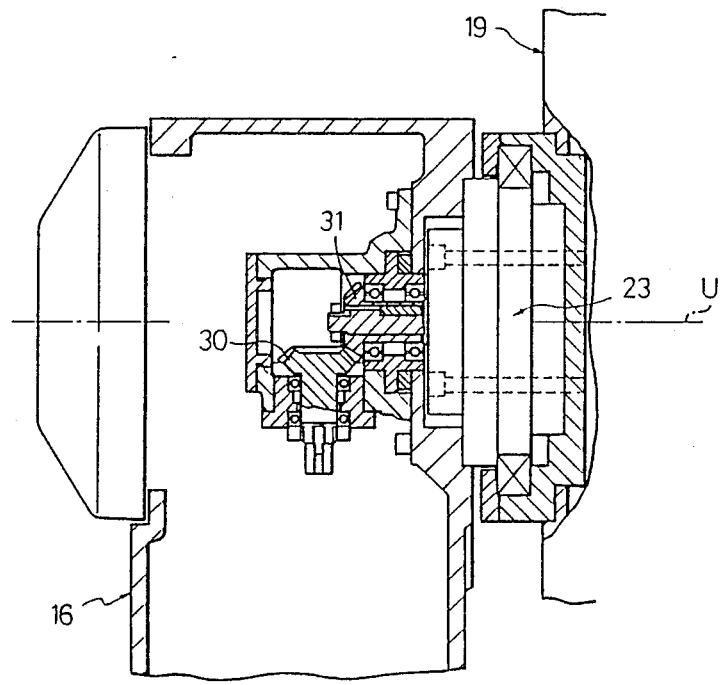
FIG. 6 is a cross-sectional view of a part of the robot shown in FIG. 1, taken along the line VI-VI in FIG. 5.

As shown in FIGS. 2 and 4, the output shaft 24b of the upper arm drive motor 24 is connected to the turning body 12 through a pair of bevel gears 26 and 27 and reduction gears 28. As shown in FIGS. 1, 2, 5, and 6, the output shaft 25b of the forearm drive motor 25 is connected to the forearm 19 through a universal joint 29, a pair of bevel gears 30 and 31, and reduction gears 32.

Accordingly, the upper arm 16 is rotated about the second axis W due to operation of the upper arm drive motor 24, and the forearm 19 is rotated about the third axis U due to operation of the forearm drive motor 25. The turning body 12 rotates within an angular range of nearly 90 degrees to the right and to the left, respectively, relative to a reference position shown in FIG. 1, and the upper arm 16 rotates from a nearly vertical attitude shown in the Figures toward the front of the turning body 12 up to an angular position in which the upper arm is in a nearly horizontal attitude, and the forearm 19 rotates from a reference position in which the forearm intersects the upper arm 16 at a right angle the upper arm 16 toward the opposite directions within an angular range of a nearly 90 degrees, respectively. Accordingly, in FIG. 1, a region to the right of the turning body 12 of the robot is a workable region of the robot.

In the vertical multi-articulated robot having the above-mentioned construction, a moment of force directed clockwise in FIG. 1 is generated about the second axis W of the upper arm 16 due to a load acting on the upper arm 16 and the weight of the upper arm 16. However, a moment of force directed counter-clockwise is also generated about the second axis W due to the weight of the upper arm drive motor 24 and the weight of the forearm drive motor 25, when the upper arm 16 is inclined toward the front of the robot. Accordingly, a load acting on the upper arm drive motor 24 due to the moment of force is reduced.

Further, since the upper arm drive motor 24 and the forearm drive motor 25 extend toward the back of the robot and do not project laterally from the robot, the upper arm drive motor 24 and the forearm drive motor 25 is kept out of the workable region of the robot when the turning body 12 rotates about the first axis 8 within the angular range of a nearly 90 degrees to the right and to the left, respectively, relative to the reference position. Accordingly, it is possible to use the workable region of the robot to the maximum extent.

When the upper arm drive motor 24 is located just below the second axis W of the upper arm 16, a counterbalancing action caused by the weight of the motor can be maximized. However, since it is necessary to ensure a space for mounting the motor beneath the second axis W, a problem will arise in that the height of the turning body 12 is too tall. In this respect, in the vertical multi-articulated robot having the above-mentioned construction, the upper arm drive motor 24 extends toward the back of the robot when the robot is in a vertical attitude.

Further, in the above-mentioned embodiment, the second axis W is located in front of the turning body 12 and apart from the first axis $\theta$ of the turning body 12 by a distance D. Accordingly, it is possible to reduce the spaces necessary to allow movement of the upper arm drive motor 24 and the forearm drive motor 25 about the first axis θ of the turning motor 12.

The present invention has been described with reference to the embodiment illustrated in the accompanying drawings, but the present invention is not limited thereto. For example, the direction of the rotation shafts of the upper arm drive motor and the forearm drive motor can be slightly modified, and the power transmitting mechanisms for these motors can be modified. Further, the plane of installation for the base is not limited to a horizontal surface and may be an inclined surface.

CAPABILITY OF EXPLOITATION IN INDUSTRY

As is apparent from the foregoing description, according to the present invention, the weight of each of the upper drive motor and the forearm drive motor can be used to counter balance the moment of force about the rotational axis of the upper arm, and the reduction of the working space of the robot in the direction of turning of the turning body due to the arrangement of the motors can be prevented. Accordingly, it is possible to provide a vertical multi-articulated robot which can use a small upper arm drive motor, and thus substantially increase the working space of the robot.

We claim:

1. A vertical multi-articulated robot comprising:
   a base secured to a horizontal plane of installation;
   a turning body provided on the base and rotatable to take angular diverse positions with respect to the base about a first axis thereof perpendicular to said horizontal plane of installation;
   a first body drive motor for driving and rotating the turning body with respect to the base about the first axis;
   an upper arm having a base end and a tip and coupled at the base end thereof to the turning body so as to be rotatable with respect to the turning body about a second axis, said second axis being in parallel with the horizontal plane and perpendicular to and spaced from the first axis;
   an upper arm drive motor for driving and rotating the upper arm with respect to the turning body about the second axis, the upper arm drive motor being fixed to said upper arm at one end thereof substantially at said second axis such that said upper arm drive motor is extended from the second axis over the first axis with a fixed angle between the axis of said upper arm drive motor and a longitudinal axis of said upper arm;
   a forearm coupled to the tip of the upper arm so as to be rotatable with respect to the upper arm about a third axis parallel to the second axis and provided at the front end thereof with a wrist assembly, the forearm being extended from the third axis away from the first axis;
   a forearm drive motor for driving and rotating the forearm with respect to the upper arm about the third axis, the forearm drive motor being fixed to said upper arm with a fixed angle therebetween at a position away from said second axis over said first axis;
   wherein the upper arm drive motor and the forearm drive motor are attached to the upper arm and extended from a first plane including the second and third axes toward the first axis in a manner such that the rotational axes of said motors are located on a second plane which intersects with the second axis at a right angle and such that the weights of the motors generate a substantial moment of inertia opposite to the one generated by the weight of said forearm.

2. The vertical multi-articulated robot according to claim 1, wherein said turning body is rotatable within the angular ranges of nearly 90 degrees in clockwise and anti-clockwise directions.

3. The vertical multi-articulated robot according to claim 1, wherein said rotational axis of the first body drive motor is substantially identical to the first axis.

4. The vertical multi-articulated robot according to claim 1, wherein said turning body is a cylindrical body within which said first body drive motor is positioned.

5. The vertical multi-articulated robot according to claim 1, wherein said upper arm and said arm drive motor form a unitary reversed-L shape.

* * * * *